United States Patent
Komatsu

(10) Patent No.: US 7,993,561 B2
(45) Date of Patent: Aug. 9, 2011

(54) METHOD FOR PRODUCING CERAMIC HONEYCOMB FILTER

(75) Inventor: Junji Komatsu, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 49 days.

(21) Appl. No.: 12/299,398

(22) PCT Filed: Sep. 27, 2007

(86) PCT No.: PCT/JP2007/068871
§ 371 (c)(1),
(2), (4) Date: Nov. 3, 2008

(87) PCT Pub. No.: WO2008/047557
PCT Pub. Date: Apr. 24, 2008

(65) Prior Publication Data
US 2009/0200693 A1    Aug. 13, 2009

(30) Foreign Application Priority Data
Sep. 28, 2006 (JP) ................... 2006-265351

(51) Int. Cl.
*B29C 47/00* (2006.01)

(52) U.S. Cl. .................................. 264/177.12

(58) Field of Classification Search .............. 264/177.12
See application file for complete search history.

(56) References Cited

U.S. PATENT DOCUMENTS

| | | | | |
|---|---|---|---|---|
| 5,238,627 A * | 8/1993 | Matsuhisa et al. | ........... | 264/645 |
| 5,387,564 A * | 2/1995 | Takeuchi et al. | ........... | 502/62 |
| 6,680,101 B1 * | 1/2004 | Kato | ........... | 428/116 |
| 7,591,918 B2 | 9/2009 | Suwabe et al. | | |
| 2004/0051196 A1 * | 3/2004 | Otsuka et al. | ........... | 264/41 |
| 2005/0221974 A1 | 10/2005 | Tomita | | |
| 2006/0208397 A1 | 9/2006 | Ichikawa | | |
| 2006/0257620 A1 * | 11/2006 | Noguchi et al. | ........... | 428/116 |
| 2008/0124516 A1 | 5/2008 | Noguchi et al. | | |

FOREIGN PATENT DOCUMENTS

| | | |
|---|---|---|
| CN | 1509209 A | 6/2004 |
| EP | 0390497 * | 10/1990 |
| EP | 1 422 390 A1 | 5/2004 |
| EP | 1 452 512 A1 | 9/2004 |
| EP | 1 489 060 A1 | 12/2004 |
| EP | 1 547 743 A1 | 6/2005 |
| JP | 02-251406 A | 10/1990 |
| JP | 05-339601 * | 12/1993 |
| JP | 05-339601 A | 12/1993 |
| JP | 2000-238022 A | 9/2000 |
| JP | 2001-152026 A | 6/2001 |
| JP | 2003-038919 A | 2/2003 |
| JP | 2005-271395 A | 10/2005 |
| JP | 2006-264237 A | 10/2006 |
| WO | 2005/090262 A1 | 9/2005 |

* cited by examiner

*Primary Examiner* — Joseph S Del Sole
*Assistant Examiner* — Kimberly A Stewart
(74) *Attorney, Agent, or Firm* — Sughrue Mion, PLLC

(57) ABSTRACT

A method for producing a ceramic honeycomb filter by blending a starting material mixture comprising a ceramic material, a molding aid and a pore-forming material under a pressure of 0.12-0.5 MPa in a pressure kneader to form a moldable material for a honeycomb extrudate.

6 Claims, 2 Drawing Sheets

1

METHOD FOR PRODUCING CERAMIC HONEYCOMB FILTER

CROSS REFERENCE TO RELATED APPLICATION

This application is a National Stage of International Application No. PCT/JP2007/068871 filed Sep. 27, 2007, claiming priority based on Japanese Patent Application No. 2006-265351, filed Sep. 28, 2006, the contents of all of which are incorporated herein by reference in their entirety.

FIELD OF THE INVENTION

The present invention relates to a method for producing an exhaust-gas-cleaning ceramic honeycomb filter, particularly to a method for blending ceramic materials for an extrusion-molded body.

BACKGROUND OF THE INVENTION

Exhaust gases from diesel engines contain fine particles (particulate matter) mostly comprising carbon (soot, etc.) and high-boiling-point hydrocarbons, which are likely to adversely affect humans and the environment when discharged to the air. Accordingly, a ceramic honeycomb filter (hereinafter referred to as "honeycomb filter") for removing the particulate matter to clean the exhaust gas has conventionally been mounted in an exhaust pipe connected to a diesel engine. As shown in FIG. 2, a honeycomb filter 20 comprises a ceramic honeycomb structure 21 comprising porous cell walls 7 forming large numbers of flow paths 5, 6 and a peripheral wall 8, and plugs 11a, 11b alternately sealing both ends 9, 10 of the flow paths 5, 6 in a checkerboard pattern.

A method widely used for the production of the above honeycomb structure 21 comprises the steps of blending a mixture of a ceramic material, a molding aid, a pore-forming material for forming pores in the cell walls, etc. with water to prepare a moldable material for forming a honeycomb extrudate (hereinafter referred to simply as "moldable material"), and extrusion-molding and sintering the resultant blend to form a honeycomb structure. In the honeycomb structure used as a filter, the pore diameter and the porosity should be controlled to improve the efficiency of capturing particulate matter in the exhaust gas and reduce pressure loss. The control of the pore diameter and the porosity has conventionally been conducted by adjusting the amount of a pore-forming material such as coal powder, wheat powder, etc. To obtain honeycomb structures having smaller thermal expansion and higher porosity, microcapsules (gas-containing resin balloons) described, for instance, in JP 2003-38919 A have recently got used as a pore-forming material.

In the step of blending a mixture of a ceramic material, a pore-forming material, etc. with water, it is important to uniformly blend the moldable material while removing as much air as possible from the moldable material. If the moldable material were not uniformly blended, or if air were not sufficiently removed from the moldable material, the resultant honeycomb structure would have defects.

As a technology for uniformly blending a moldable material to reduce the amount of air remaining in the moldable material, JP 2005-271395 A discloses a screw-type, vacuum-blending machine comprising a first drum comprising a divider having pluralities of flow paths for finely dividing the moldable material at an outlet, and a second drum in which the moldable material coming from pluralities of flow paths of the divider is degassed in vacuum while blending. However, because microcapsules (gas-containing resin balloons) are less resistant to a shearing force, they are likely broken by an excessive shearing force exerted during blending when the screw-type blending machine described in JP 2005-271395 A is used, resulting in a honeycomb structure with small porosity. When microcapsule shells are as thin as 0.1-2 μm, the microcapsules are easily broken. This is remarkable particularly when the shells are as thin as 0.1-0.8 μm, resulting in a honeycomb structure with extremely small porosity. When a large amount of microcapsules are added to the moldable material to obtain the desired porosity, the moldable material has a small viscosity, resulting in an extrusion-molded honeycomb with poor shape retention, and thus poor dimensional accuracy. It is thus difficult to produce, for instance, a large honeycomb structure having a diameter of 180 mm or more in a cross section perpendicular to flow paths, and large porosity. Although blending with a low speed and a low shearing force reduces the breakage of microcapsules, providing a honeycomb structure with large porosity, a uniform moldable material cannot be obtained because of insufficient blending. Such non-uniform moldable material contains small portions with different fluidity, providing an extrusion-molded honeycomb with breakage and/or undulation in cell walls. A ceramic honeycomb filter formed from such a non-uniformly molded body suffers a low particulate-matter-capturing ratio due to the breakage of cell walls, and large pressure loss due to the undulation of cell walls.

JP 2006-264237 A discloses a method for producing molded honeycomb by blending starting materials containing ceramic materials in a blending machine to form a moldable material, which is extruded and cut to a desired length, and then extruded from a piston-type extruder. Even with the blending machine described in JP 2006-264237 A, microcapsules are broken by an excessive shearing force exerted during blending, resulting in a honeycomb structure with small porosity.

In a method using a kneader comprising two rotors that rotate for blending, air is likely introduced into the resultant moldable material, providing a honeycomb structure with defects. Accordingly, the blending of moldable materials with a kneader is not common.

OBJECT OF THE INVENTION

Accordingly, an object of the present invention is to provide a method for producing a honeycomb structure having high porosity without defects such as breakage and undulation, by conducting efficient blending without applying excessive shearing to avoid the breakage of microcapsules.

DISCLOSURE OF THE INVENTION

As a result of extensive investigation in view of the above object, the inventors have found that a ceramic honeycomb filter having high porosity without defects can be obtained by blending in a pressure kneader. The present invention has been completed based on such findings.

Thus, the method of the present invention for producing a ceramic honeycomb filter comprises blending a starting material mixture comprising a ceramic material, a molding aid and a pore-forming material under a pressure of 0.12-0.5 MPa in a pressure kneader to form a moldable material for a honeycomb extrudate.

The moldable material after blending preferably has hardness of 16-23 (measured by a type-C durometer according to JIS K7312).

The blending is preferably conducted in a reduced-pressure atmosphere. The reduced-pressure atmosphere preferably has vacuum degree of $2 \times 10^{-2}$ MPa or more as a gauge pressure.

The temperature of the moldable material during blending is preferably 15-35° C.

The moldable material after blending is preferably extrusion-molded by a piston-type extruder to a honeycomb shape.

Another method of the present invention for producing a ceramic honeycomb filter comprises the steps of blending a starting material mixture comprising a ceramic material, a molding aid and a pore-forming material under a pressure of 0.12-0.5 MPa in a pressure kneader to form a moldable material for a honeycomb extrudate, and then extrusion-molding the blended moldable material to a honeycomb shape using a direct-piston-type extruder.

BRIEF DESCRIPTION OF THE DRAWINGS

FIG. 1 (b) is a plan view showing a pressure kneader used in the present invention, with a pressure lid omitted.

DESCRIPTION OF THE BEST MODE OF THE INVENTION (1) Pressure Kneader

Figure 1A:
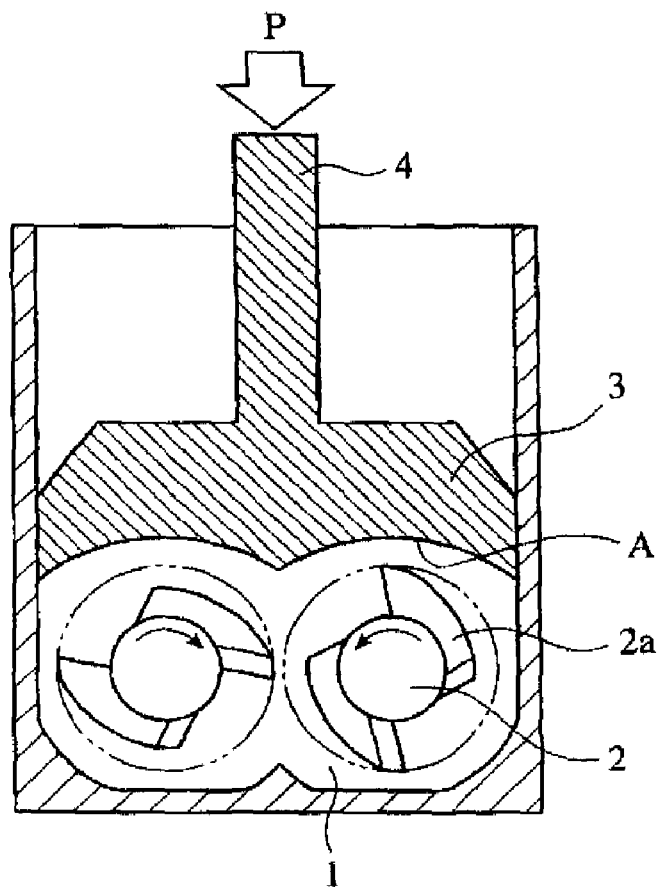
FIG. 1 (a) is a cross-sectional view showing a pressure kneader used in the present invention.
Figure 1B:
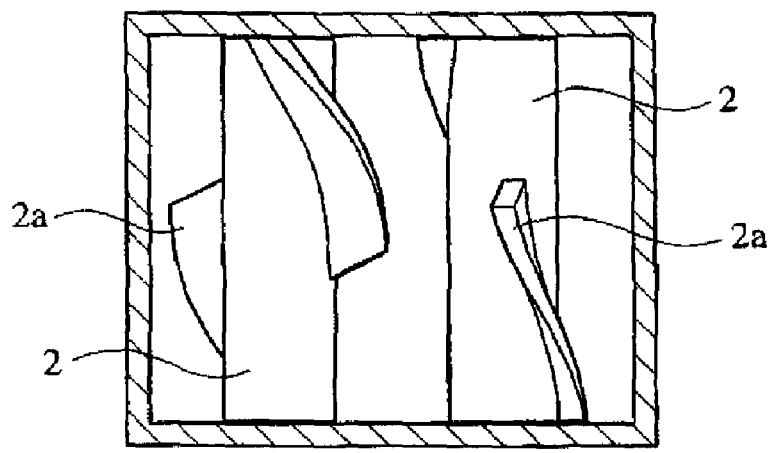
Figure 2:
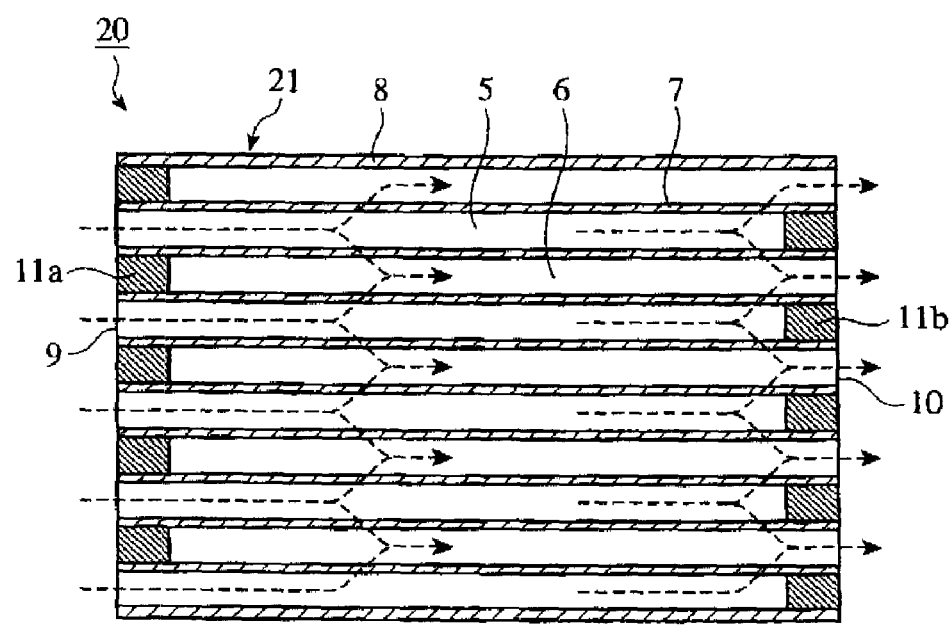
FIG. 2 is a schematic cross-sectional view showing one example of the ceramic honeycomb filters.

As a result of intensive research, the inventor has found that such problems as the low porosity of a honeycomb structure due to the breakage of microcapsules in a blending step, and the breakage and undulation of a honeycomb structure because of air remaining in the moldable material and insufficient blending, can be prevented by blending a material comprising a ceramic material, a molding aid and a pore-forming material in a pressure kneader. As shown in FIG. 1 (a), the pressure kneader has a structure, in which a material (not shown) in a blending bath 1 is blended by rotors 2 while being pressurized by a pressure lid 3. As shown in FIG. 1 (b), each rotor 2 alternately has two blades 2a arranged without contact. Two rotors may rotate synchronously or independently. The material in the blending bath 1 is pressurized by a load applied by the pressure lid 3 and a piston shaft 4, and a force P of the piston shaft 4 pushing the pressure lid 3. The blending under pressure can shorten blending time because of higher efficiency than blending in a non-pressure kneader.

Although blending by the above kneader is likely to cause the moldable material to contain air, the inventor has found that the amount of air remaining in the moldable material can be extremely reduced by high pressure in a pressure kneader. The higher the pressure, the more effect can be obtained. 0.12 MPa or more of pressure can reduce the defects of the honeycomb structure to a level causing no practical problems. When the pressure is lower than 0.12 MPa, air remains, and a moldable material pushed up by the rotors toward the pressure lid stays immediately below the pressure lid, causing insufficient blending and thus making the extrusion speed uneven. Thus, the resultant honeycomb structure suffers defects such as breakage and undulation.

When the pressure is too high, microcapsules are broken by an excessive shearing force. This is remarkable particularly when the pressure is higher than 0.5 MPa. The breakage of microcapsules is more prevented at the pressure of 0.5 MPa or less than when a screw-type blending machine is used, providing a honeycomb structure with larger porosity. Particularly when the ceramic powder contains pulverized amorphous particles such as amorphous silica, ragged shapes of amorphous particles tend to break microcapsules. Accordingly, the pressure is preferably lower to avoid the breakage of microcapsules. When the pressure is higher than 0.5 MPa, the pressure lid is likely to hinder the moldable material from being pushed up by the rotors, resulting in insufficient blending. Accordingly, the resultant honeycomb structure has such defects as breakage and undulation. Particularly when the ceramic materials have an average particle size of 0.1-30 µm, or when the moldable material containing 10-30 parts of water per 100 parts of the material powder is blended, such defects as breakage and undulation easily occur.

Accordingly, the pressure in a pressure kneader is 0.12-0.5 MPa, preferably 0.15-0.4 MPa. The pressure is defined as a value obtained by dividing (force P of the piston shaft 4 pushing the pressure lid 3+load by the pressure lid 3+load by the piston shaft 4) by an area A of the pressure lid 3 coming into contact with the material.

The pressure kneader can uniformly blend a moldable material in a short period of time while suppressing air from being introduced during blending with the properly set pressure as described above. To remove air from the moldable material, the blending is conducted preferably in a reduced-pressure atmosphere. With the vacuum degree of $2 \times 10^{-2}$ MPa or more as a gauge pressure during blending, air can be removed from the moldable material in a shorter period of time. Accordingly, blending in the kneader can provide a molded honeycomb free from such defects as the breakage of cell walls, etc., without the step described in JP 2005-271395 A, in which the blended moldable material is extruded in a noodle shape to remove air. The vacuum degree is expressed by a gauge pressure (difference from the atmospheric pressure); the larger its value, the higher the vacuum degree. In the present invention, the vacuum degree during blending is more preferably $4 \times 10^{-2}$ MPa or more, further preferably $5 \times 10^{-2}$ MPa or more. An extremely high vacuum degree evaporates water in the moldable material during blending, providing the blended moldable material with too high hardness particularly when the moldable material has a small water content or a high temperature. Accordingly, the vacuum degree is preferably $8.5 \times 10^{-2}$ MPa or less.

Figure 3:
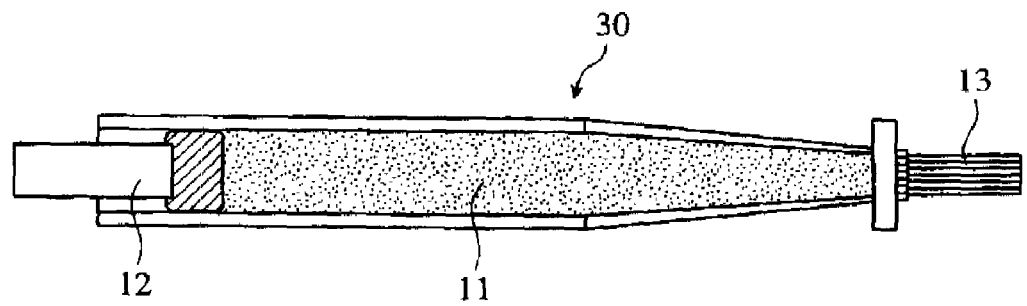
FIG. 3 is a cross-sectional view showing one example of the piston-type extruders.

The blending step is preferably conducted only in the above pressure kneader. In the extrusion molding of the moldable material blended in the pressure kneader in a honeycomb shape, as shown in FIG. 3, a piston-type extruder 30 is preferably used. In FIG. 3, the moldable material 11 is extruded by a piston 12 to obtain a molded honeycomb 13. Using the piston-type extruder 30, a shearing force applied to microcapsules in the moldable material 11 can be minimized, thereby preventing their breakage. The piston-type extrusion molding is preferably conducted immediately after blending in the pressure kneader. By blending in a blender or the use of a screw-type extruder, the resultant honeycomb structure is provided with low porosity by the breakage of microcapsules, and uneven hardness and viscosity by different degrees of blending between a region near the screw and a peripheral region and locally high temperatures in the moldable material.

(2) Moldable Material

To further reduce a shearing force applied to microcapsules during blending, the moldable material is preferably soft. The reduction of the hardness of the moldable material prevents the breakage of microcapsules, providing the honeycomb structure with larger porosity. The moldable material after blending has hardness (measured by a type-C durometer according to JIS K7312, and hereinafter referred to simply as "durometer hardness") of preferably 23 or less, more preferably 22 or less. When the hardness of the moldable material is too low, an extrusion-molded body is deformed by its own weight. Accordingly, the durometer hardness of the moldable material after blending is preferably 16 or more, more preferably 18 or more. The durometer hardness can be adjusted by the amount of water relative to the ceramic materials.

The temperature of the moldable material is preferably 15-35° C. during blending. The moldable material has low viscosity at low temperatures, so that the extrusion-molded body is easily deformed by its own weight. With the moldable material at 15° C. or higher during blending, the moldable material has high viscosity without heating during extrusion molding, resulting in small deformation of the molded body. When the moldable material contains methylcellulose as a binder, the moldable material has extremely high viscosity at excessively high temperatures, so that the cell walls of the molded honeycomb tend to suffer breakage and undulation. Because the once increased viscosity does not easily lower even when the temperature decreases, the moldable material is preferably kept at 35° C. or lower during blending. The more preferred temperature of the moldable material is 20-30° C. Because the temperature of the moldable material is usually elevated with time during blending, the temperature need only be within the above range when the blending is completed. The temperature is measured by a thermometer inserted into the moldable material balk within 3 minutes after the completion of the blending.

(3) Ceramic Materials

Though not particularly restricted, the ceramic material preferably comprises at least one of cordierite, alumina, mullite, silicon nitride, sialon, silicon carbide, aluminum titanate, aluminum nitride, LAS, etc. Among them, a ceramic honeycomb structure made of cordierite as a main crystal preferably has a small thermal expansion coefficient and excellent thermal shock resistance.

(4) Pore-Forming Material

The pore-forming material is preferably in the form of a microcapsule of a resin shell containing a gas. The use of such pore-forming material remarkably provides the effect of the present invention. The microcapsule is more preferably a foamed resin (resin balloon) with a shell thickness of 0.1-0.8 µm. Though not particularly restricted, the resins are preferably made of acrylates, methacrylates, carboxylic acids, etc. The amount of microcapsules added may differ depending on the targeted porosity, etc. of the honeycomb structure. To obtain a honeycomb structure with large porosity, it is preferably 4-13% by mass, more preferably 5-10% by mass, based on the ceramic material. In addition to the microcapsules, one or more other pore-forming materials (carbon-based powder such as graphite, starch powder such as wheat powder and corn starch, resin powder such as polyethylene terephthalate powder, polymethyl methacrylate powder, etc.) may be used.

The present invention will be described in detail with reference to Examples below without intension of limitation.

Example 1

Kaolin powder, talc powder, silica powder, alumina powder, and aluminum hydroxide powder were formulated to provide a cordierite-forming material powder having a composition comprising 50% by mass of $SiO_2$, 35% by mass of $Al_2O_3$, and 15% by mass of MgO in a bath 1 in the pressure kneader shown in FIG. 1. This powder was mixed with methylcellulose and hydroxypropylmethylcellulose as a molding aid, a lubricant, a foamed resin as a pore-forming material, and water, and blended under pressure of 0.5 MPa for 50 minutes without evacuating the bath 1 to form a moldable ceramic material. The temperature and durometer hardness of the moldable material were measured when the blending was completed. The results are shown in Table 1.

The moldable material was extrusion-molded by a direct piston-type extruder to from a honeycomb having a diameter of 180 mm, a length of 180 mm, a cell wall thickness of 0.3 mm, and a cell wall pitch of 1.5 mm. This molded honeycomb was placed on a flat table with its flow paths vertical, and dried for 5 hours to measure its length before and after drying. The shrinkage ratio of the molded honeycomb was determined from the difference between the length before drying and the length after drying, and evaluated according to the following standard. The results are shown in Table 1.

Excellent: Substantially no shrinkage (shrinkage ratio: less than 3%).

Good: Shrank without practical problems (shrinkage ratio 3-4%).

Poor: Shrank with practical problems (shrinkage ratio: more than 4%).

The dried honeycomb was sintered at 1400° C. for 4 hours to produce a honeycomb structure. The porosity of this honeycomb structure was measured by a mercury intrusion porosimetry, and the breakage and undulation of the honeycomb structure were observed by the naked eye and evaluated by the flowing standard. The results are shown in Table 1.

Excellent: No breakage or undulation observed.

Good: There were breakage or undulation without practical problems.

Poor: There were breakage or undulation.

Examples 2-5

Blending was conducted in the same manner as in Example 1 except for changing the pressure as shown in Table 1, to form moldable materials. The pressures and the moldable material temperatures in these Examples are shown in Table 1. Using each moldable material, the production of a molded body, the measurement of a shrinkage ratio, the sintering of a molded honeycomb, the measurement of porosity, and the evaluation of breakage and undulation were conducted in the same manner as in Example 1. The results are shown in Table 1.

Examples 6-10

Blending was conducted in the same manner as in Example 3 except for changing the moldable material temperature and/or the durometer hardness as shown in Table 1, to form moldable materials. The pressures, and the temperatures and durometer hardness of the moldable materials in these Examples are shown in Table 1. Using each moldable material, the production of a molded body, the measurement of a shrinkage ratio, the sintering of a molded honeycomb, the measurement of porosity, and the evaluation of breakage and undulation were conducted in the same manner as in Example 1. The results are shown in Table 1.

Examples 11-16

Blending was conducted in the same manner as in Example 3 except for changing the temperature and durometer hardness of the moldable material and/or the vacuum degree in the bath 1 as shown in Table 1, to form moldable materials. The pressures, and the temperatures and durometer hardness of the moldable materials in these Examples are shown in Table 1. Using each moldable material, the production of a molded body, the measurement of a shrinkage ratio, the sintering of a molded honeycomb, the measurement of porosity, and the evaluation of breakage and undulation were conducted in the same manner as in Example 1. The results are shown in Table 1.

Comparative Examples 1-6

Blending was conducted in the same manner as in Example 1 except for changing the pressure, the vacuum degree, and the temperature and durometer hardness of the moldable material after blending as shown in Table 1, to form moldable materials of Comparative Examples 1-4.

Blending was conducted in the same manner as in Example 1 except for conducting the blending in a screw-type blender without evacuation and then the molding by a screw-type extruder, to form a moldable material of Comparative Example 5.

Blending was conducted in the same manner as in Comparative Example 1 except for changing the blending time to 70 minutes, to form a moldable material of Comparative Example 6.

The pressure and vacuum degree during blending, and the temperature and durometer hardness of the moldable material in Comparative Examples 1-6 are shown in Table 1. Using each moldable material, the production of a molded body, the measurement of a shrinkage ratio, the sintering of a molded honeycomb, the measurement of porosity, and the evaluation of breakage and undulation were conducted in the same manner as in Example 1. The results are shown in Table 1.

TABLE 1

| No. | Blending Conditions | | | | 
|---|---|---|---|---|
| | Pressure (MPa) | Vacuum Degree* (×10⁻² MPa) | Moldable Material Temperature (° C.) | Durometer Hardness |
| Example 1 | 0.5 | — | 36 | 24 |
| Example 2 | 0.4 | — | 36 | 24 |
| Example 3 | 0.3 | — | 36 | 24 |
| Example 4 | 0.2 | — | 36 | 24 |
| Example 5 | 0.12 | — | 36 | 24 |
| Example 6 | 0.3 | — | 35 | 23 |
| Example 7 | 0.3 | — | 20 | 22 |
| Example 8 | 0.3 | — | 19 | 20 |
| Example 9 | 0.3 | — | 17 | 17 |
| Example 10 | 0.3 | — | 15 | 16 |
| Example 11 | 0.3 | 1 | 30 | 22 |
| Example 12 | 0.3 | 2 | 30 | 22 |
| Example 13 | 0.3 | 5 | 25 | 20 |
| Example 14 | 0.3 | 8.5 | 20 | 18 |
| Example 15 | 0.3 | 5 | 10 | 15 |
| Example 16 | 0.3 | 5 | 40 | 25 |
| Comparative Example 1 | 0.1 | — | 36 | 24 |
| Comparative Example 2 | 0 | 9 | 25 | 20 |
| Comparative Example 3 | 0.6 | — | 25 | 20 |
| Comparative Example 4 | 1.0 | — | 40 | 24 |
| Comparative Example 5 | Screw | — | 25 | 23 |
| Comparative Example 6 | 0 | — | 36 | 24 |

TABLE 1-continued

| No. | Molded Body Shrinkage Ratio | Honeycomb Structure | |
|---|---|---|---|
| | | Porosity (%) | Breakage and Undulation |
| Example 1 | Excellent | 61 | Good |
| Example 2 | Excellent | 61 | Good |
| Example 3 | Excellent | 62 | Good |
| Example 4 | Excellent | 62 | Good |
| Example 5 | Excellent | 62 | Good |
| Example 6 | Excellent | 63 | Good |
| Example 7 | Excellent | 63 | Good |
| Example 8 | Excellent | 63 | Good |
| Example 9 | Excellent | 64 | Good |
| Example 10 | Excellent | 64 | Good |
| Example 11 | Excellent | 63 | Good |
| Example 12 | Excellent | 63 | Excellent |
| Example 13 | Excellent | 63 | Excellent |
| Example 14 | Excellent | 63 | Excellent |
| Example 15 | Good | 64 | Excellent |
| Example 16 | Excellent | 61 | Good |
| Comparative Example 1 | Excellent | 64 | Poor |
| Comparative Example 2 | Excellent | 64 | Poor |
| Comparative Example 3 | Excellent | 57 | Good |
| Comparative Example 4 | Excellent | 54 | Poor |
| Comparative Example 5 | Excellent | 52 | Poor |
| Comparative Example 6 | Excellent | 61 | Poor |

Note:
*The vacuum degree was expressed by a gauge pressure (difference from the atmospheric pressure).

The results of Examples 1-16 and Comparative Examples 1-6 indicate that in Examples 1-16 in which blending was conducted under a pressure of 0.12-0.5 MPa, the porosity was as high as 61-64%, with breakage or undulation not observed or on a practically harmless level. However, Comparative Examples 1 and 2, in which blending was conducted under a pressure of less than 0.12 MPa, suffered breakage or undulation due to air remaining in the moldable material and insufficient blending, indicating that the blending was not completed in 50 minutes. In Comparative Examples 3 and 4, in which blending was conducted under a pressure of more than 0.5 MPa, the sintered honeycomb structure had a small porosity as 54-57%, indicating that the resin balloons were broken during blending. Particularly in Comparative Example 4, in which the pressure was as high as 1.0 MPa, breakage and undulation were observed. In Comparative Example 4 using the screw-type blender, the sintered honeycomb structure had as small porosity as 52%, indicating that the resin balloons were broken during blending. Also, the breakage or undulation was observed because of no evacuation during blending. Comparative Example 6, in which the blending was conducted without pressuring, suffered breakage or undulation due to the remaining of air in the moldable material and insufficient blending, indicating that the blending was not completed despite the blending time extended 1.4 times.

Examples 6-10 having the durometer hardness of 16-23 exhibited higher porosity than Example 3 having the durometer hardness of 24, indicating that the percentage of the resin balloons remaining unbroken further increased. In Examples 12-15, in which the bath 1 was evacuated to a vacuum degree of $2\times10^{-2}$ MPa or more as a gauge pressure while blending, the moldable material temperature was 30° C. or lower, and the durometer hardness was adjusted to 22 or less, no breakage or undulation was observed unlike Examples 1-5. In Example 12-14, in which the moldable material temperature was 20° C. or higher, and the durometer hardness was 18 or more, particularly good results were obtained with substantially no shrinkage.

EFFECTS OF THE INVENTION

Because the method of the present invention conducts blending with a reduced shearing force applied to microcapsules, it can prevent the breakage of microcapsules, thereby providing a honeycomb structure having porosity of 50-70%, further as large as 60-70%. It is particularly suitable for obtaining a large-sized, large-porosity honeycomb structure having a diameter of 180 mm or more in a cross section perpendicular to its flow paths. Further, because the amount of air remaining in the moldable material is reduced, the honeycomb structure can avoid having breakage and undulation.

What is claimed is:

1. A method for producing a ceramic honeycomb filter comprising blending a starting material mixture comprising a ceramic material, a molding aid, water and a pore-forming material consisting essentially of microcapsules of a resin shell containing a gas under a pressure of 0.12-0.5 MPa in a pressure kneader to form a moldable material for a honeycomb extrudate;

wherein the molding aid comprises methylcellulose as a binder; and wherein an amount of the pore-forming material is of from 4-13% by mass.

2. The method for producing a ceramic honeycomb filter according to claim 1, wherein said moldable material after blending has hardness of 16-23 (measured by a type-C durometer according to JIS K7312).

3. The method for producing a ceramic honeycomb filter according to claim 1, wherein the blending is conducted in a reduced-pressure atmosphere.

4. The method for producing a ceramic honeycomb filter according to claim 3, wherein the blending is conducted in a reduced-pressure atmosphere having a vacuum degree of $2 \times 10^{-2}$ MPa or more as a gauge pressure.

5. The method for producing a ceramic honeycomb filter according to claim 1, wherein the temperature of said moldable material is 15-35° C. during blending.

6. The method for producing a ceramic honeycomb filter according to claim 1, further comprising the step of extrusion-molding the blended moldable material to a honeycomb shape using a piston-type extruder.

* * * * *